United States Patent
Paul et al.

(10) Patent No.: US 8,959,536 B2
(45) Date of Patent: Feb. 17, 2015

(54) METHOD AND SYSTEM FOR PROVIDING APPLICATIONS TO VARIOUS DEVICES

(75) Inventors: Sanjoy Paul, Bangalore (IN); Manish Jain, New Delhi (IN)

(73) Assignee: Infosys Limited (IN)

( * ) Notice: Subject to any disclaimer, the term of this patent is extended or adjusted under 35 U.S.C. 154(b) by 921 days.

(21) Appl. No.: 12/542,990

(22) Filed: Aug. 18, 2009

(65) Prior Publication Data

US 2010/0043017 A1 Feb. 18, 2010

(30) Foreign Application Priority Data

Aug. 18, 2008 (IN) .......................... 1990/CHE/2008

(51) Int. Cl.
*G06F 13/00* (2006.01)
*H04N 7/16* (2011.01)
*G06F 17/00* (2006.01)
*H04H 60/09* (2008.01)
*H04L 29/08* (2006.01)
*H04M 3/00* (2006.01)
*G06F 9/445* (2006.01)

(52) U.S. Cl.
CPC ........................................ *G06F 8/64* (2013.01)
USPC ............. 719/328; 725/25; 725/106; 725/109; 725/114; 725/153; 715/235; 715/237; 715/249; 715/250; 455/3.03; 455/414.4; 455/418

(58) Field of Classification Search
None
See application file for complete search history.

(56) References Cited

U.S. PATENT DOCUMENTS

| | | | |
|---|---|---|---|
| 7,428,725 B2 | 9/2008 | Niyogi et al. | |
| 7,774,746 B2* | 8/2010 | Mansfield et al. | 717/106 |
| 2001/0052910 A1* | 12/2001 | Parekh et al. | 345/744 |
| 2003/0050931 A1* | 3/2003 | Harman et al. | 707/100 |
| 2003/0108022 A1* | 6/2003 | Yamamoto | 370/338 |
| 2003/0110234 A1 | 6/2003 | Egli et al. | |
| 2003/0172368 A1* | 9/2003 | Alumbaugh et al. | 717/106 |
| 2004/0049574 A1 | 3/2004 | Watson et al. | |
| 2006/0200761 A1 | 9/2006 | Judd et al. | |
| 2007/0083810 A1* | 4/2007 | Scott et al. | 715/525 |
| 2007/0088681 A1* | 4/2007 | Aravamudan et al. | 707/3 |
| 2007/0204216 A1 | 8/2007 | Morgan | |
| 2008/0026793 A1* | 1/2008 | Teegan et al. | 455/557 |
| 2008/0281810 A1 | 11/2008 | Smyth et al. | |
| 2009/0024403 A1* | 1/2009 | Servian et al. | 705/1 |
| 2009/0213081 A1* | 8/2009 | Case, Jr. | 345/173 |
| 2009/0249242 A1* | 10/2009 | White | 715/773 |

* cited by examiner

*Primary Examiner* — H S Sough
*Assistant Examiner* — Phuong Hoang
(74) *Attorney, Agent, or Firm* — Lerner, David, Littenberg, Krumholz & Mentlik, LLP

(57) ABSTRACT

A method for providing applications to one or more requesting devices is provided. The method comprises a step of first receiving an application request from the one or more requesting devices. The method includes extracting details of the request. Further markup language structure for corresponding page of the application is generated. The markup language structure is generated by invoking page handlers which includes contacting business logic layer to get information required to be embedded in the corresponding page. The output page is then provided to the requesting device.

23 Claims, 11 Drawing Sheets

METHOD AND SYSTEM FOR PROVIDING APPLICATIONS TO VARIOUS DEVICES

BACKGROUND OF THE INVENTION

The present invention relates to the field of providing applications to various devices. More particularly, the present invention provides transformation of applications based on type of device requesting an application.

With the advent of technology, information is now readily accessible via various resources. A significant resource that is widely used for accessing information is the Internet. The Internet was earlier accessed only using a personal computer, with a good processing speed and a relatively large display size. Over the past few years, technologists and business organizations have realized the need for people to stay connected with the rest of the world through various portable devices that are available with them. One of the methods for ensuring real time information access using portable devices is providing for internet access through mobile phones.

Communication Service Providers (CSPs) are transforming their network and service infrastructure to provide "quadruple play" (voice, video, data and mobile) services to subscribers of mobile services. To monetize on their investments in infrastructure, CSPs today need applications to retain their subscriber base and also to attract new subscribers. Over the years, applications that have transformed people's lives started out as web-based applications. For example, web-based applications such as e-commerce applications, applications for hosting auctions, video sharing applications and social networking applications have their roots in the Internet. Developing and deploying new applications for computers is relatively easier compared to doing the same for mobile and/or television networks. The main reason is that access to Mobile and Television networks is very tightly controlled by the service provider and the technology to deliver a similar experience is not yet matured.

When an application becomes successful on the web, the CSPs who own the mobile and television networks (as part of their quadruple play) would like to provide a similar application on their mobile and television networks as well, but with few targeted features. In addition to replicating the web applications, CSPs would also like to provide newer categories of applications specific to TV and Mobile. For example, RSS feeds of important news from various websites, storefront to purchase video, social networking etc. By doing this, telecom operators would be able to exploit the convergence in access technology by giving their subscribers option to access various applications from computer while at office, mobile phones during transit, and TV while at home and also provide differentiated user experience for each type of application.

In some scenarios, an application may be requested by disparate devices having different operating platforms and user interfaces. Depending on the type of device requesting the application, the application may be customized for specific platforms, such as, mobile and television platforms. This approach is likely to have good quality because applications are developed from scratch keeping the requirements and constraints of the platforms on which they would be deployed, in mind. However, such an approach is quite expensive in terms of skilled resources which are required and in terms of time it would take to reach the market.

Consequently, there is a need for a method and a system that provides similar applications to various devices with minimal human intervention. Further there is a need to reduce the cost and delay in providing applications to users of devices.

BRIEF SUMMARY OF THE INVENTION

A method and system for providing applications to one or more requesting devices is provided.

The system for providing applications to one or more requesting devices includes a development framework, an execution framework, an application adaptor and a media transformation engine. The development framework is configured to facilitate generation of software code for rendering the application on the one or more requesting devices. The execution framework is configured to transform navigational and user interface related aspects of the requested application and the application adaptor is configured to generate a Markup Language structure for a page corresponding to the application. The media transformation engine in the system is configured to provide media content requested by the application to the one or more requesting devices. The execution framework is further configured to provide one or more output pages corresponding to the application to the one or more requesting devices. In an embodiment of the present invention, the markup language used for generating the page corresponding to the application is Extensible Markup Language (XML)

In an embodiment of the preset invention, the development framework is configured to facilitate generation of markup language code for rendering the application on various kinds of devices such as televisions, mobile devices, personal computers. The markup language code corresponding to a device comprises user interface layout data for rendering the application on to the device.

In an embodiment of the present invention, the development framework includes an Application Programming Interface (API) for a developer to generate the software code for rendering the application on the various requesting devices.

In various embodiments of the present invention, the application requested by a device is at least one of a web-based application, a television based application, a mobile application and a gaming application.

In an embodiment of the present invention, the requesting device may request the application through a data network. The data network may be at least one of the Internet, an Intranet and a network of two or more electronic devices.

In an embodiment of the present invention, the execution framework includes a controller configured to extract details of the application request and a request handler configured to identify the applications Adapter Class to be invoked and further configured to instantiate the Class. The execution framework further includes a device capabilities module configured to get information about capabilities of the requesting device and a device adapter configured to adapt the application to the requesting device. In an embodiment of the present invention, the capabilities comprises screen size of the requesting device. The execution framework further includes a data transformer configured to generate output page corresponding to the application in at least one of an HTML and an XHTML format. The output page is generated based on the XML page generated by the application adaptor. For providing the output page to the requesting device, the system includes a response handler. The response handler is further configured to receive XML string along with information required to transform user interface from the controller and further configured to pass the received information to the data transformer.

In an embodiment of the present invention, the media content requested by the application includes at least one of images, video and audio.

In various embodiments of the present invention, the media transformation engine includes a media controller configured to deliver request for media content to a media handler and the media handler is configured to check whether a transformed version of requested content is available in a media cache. The media transformation engine further includes a media transcoder configured to transform content from a shared storage in order to conform the content in accordance with requirements of the requesting device.

In an embodiment of the present invention, the media transformation engine further includes a customer profile module configured to track access information and receive user preferences and usage information based on one or more requests received. The media transformation engine further includes a real time analysis module configured to receive the user preferences and usage information from the user profile module and further configured to construct content data most likely to be requested based on usage information. The engine also includes a content provider configured to store content data in accordance with one or more device-specific formats.

In various embodiments of the present invention, the system for providing applications to one or more requesting devices further includes a media cache configured to store frequently requested content transformed in accordance with requirements of standard devices and a shared storage configured to store standard untransformed content, wherein the media transcoder utilizes data from shared storage in order to conform the content in accordance with requirements of the requesting device.

In an embodiment of the present invention, the requesting device at least one of a mobile device, a set top box, a personal digital assistant, Internet Protocol Television (IPTV), Open-Cable Application Platform (OCAP)-based cable television, Enhanced TV Binary Interchange Format (EBIF)-based cable television, Digital Television (DTV), and any computing device.

In various embodiments of the present invention, the development framework for generating software code for rendering the application on various requesting devices includes a user interface transformer configured to store markup language templates defining user interface layout data for rendering data on to the one or more requesting devices and a rules engine configured to facilitate the creation of markup language templates for the one or more requesting devices.

In an embodiment of the present invention, the markup language templates are created by a developer using an application programming interface. In an example, the markup language is an Extensible Markup Language (XML).

The method for providing applications to one or more requesting devices includes a first step of receiving an application request from the one or more requesting devices.

In an embodiment of the present invention, details of the requesting device are extracted from the request. The method further includes a step of generating Extensible Markup Language structure for corresponding page of the application. In an embodiment, the output page is in at least one of a Hypertext Markup Language format and an Extensible Hypertext Markup Language format. The output page is then provided to the requesting device.

In an embodiment of the present invention, the step of generating Extensible Markup Language structure for corresponding page includes obtaining information about capabilities of the requesting device from a database. The capabilities include screen size of the requesting device. Further, the applications' Adaptor Class to be invoked is identified and the Class is instantiated. Thereafter, page handlers are invoked to generate Extensible Markup Language structure for the corresponding page. In an embodiment, invoking page handlers comprises contacting business logic layer to get information required to be embedded in the corresponding page.

In an embodiment of the present invention, generating an output page corresponding to the application comprises using raw XML string along with details required to transform user interface to generate the page in at least one of an HTML and XHTML format, wherein the details include style sheets and transformation logic.

In an embodiment of the present invention, providing media content to the requesting device comprises the steps of sending a request for media content to a media controller, obtaining information about capabilities of the requesting device, checking whether media content in desired format is available in media cache based on capabilities of the requesting device, extracting Uniform Resource Identifier (URI) corresponding to the media content, if the media content is available in the media cache and providing the URI to the requesting device.

In an embodiment of the present invention, if the media content is not available in desired format in media cache, media content is first fetched from shared storage database. Thereafter, media content is transcoded in a format supported by the requesting device and the media content is stored in the media cache. Thereafter, URI corresponding to the transcoded media content is provided to the requesting device.

BRIEF DESCRIPTION OF THE DRAWINGS

The present invention is described by way of embodiments illustrated in the accompanying drawings wherein.

DETAILED DESCRIPTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
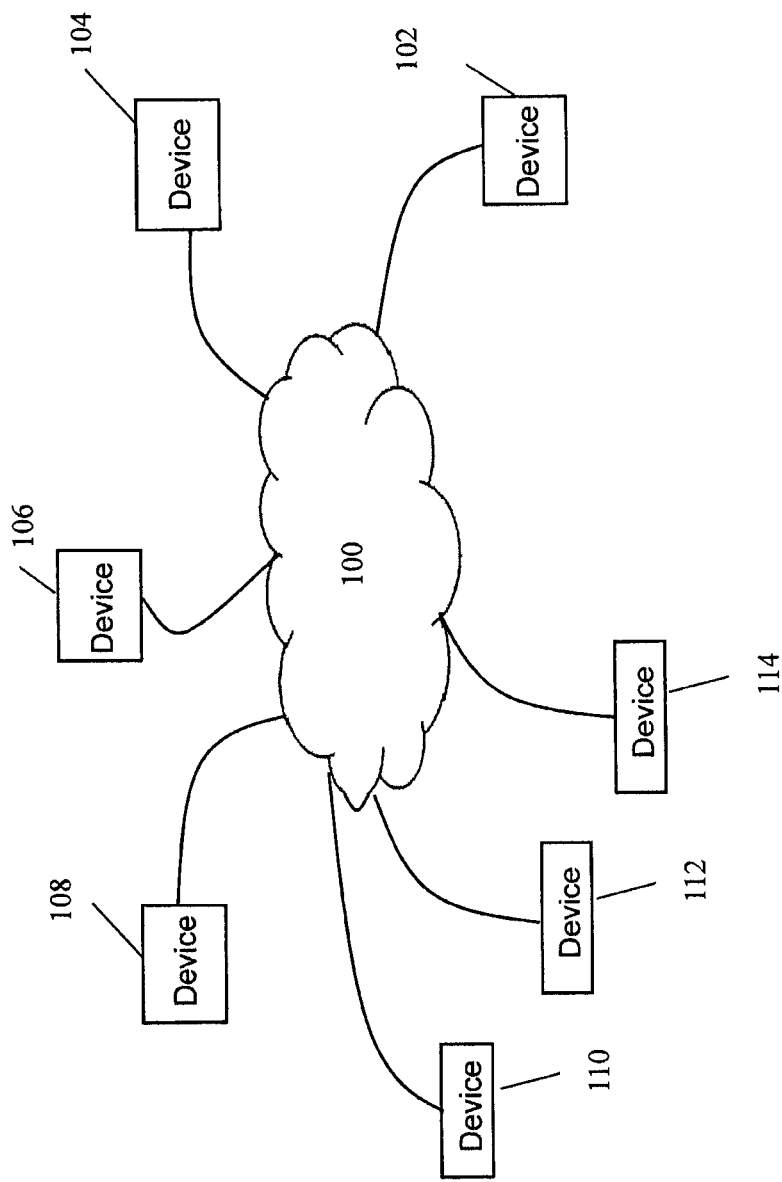
FIG. 1 illustrates an exemplary data network in accordance with an embodiment of the present invention.

FIG. 1 illustrates an exemplary data network in accordance with an embodiment of the present invention. The data network 100 comprises a first device 102 and a second device 104 in communication with the data network 100. In an embodiment of the present invention, a data network may be the Internet, an Intranet, a network of two or more electronic devices and the like. Examples of devices in the data network include, but are not limited to, mobile phones, laptops, computers, televisions such as Internet Protocol Television (IPTV), OpenCable Application Platform (OCAP)-based cable television, Enhanced TV Binary Interchange Format (EBIF)-based cable television, Digital Television (DTV) television, Direct to Home (DTH) television, a television attached to a set top box, or any other electronic device. In an embodiment of the present invention, a user, via the first device 102 sends a request to the data network 100 for an application which he wants to access. Examples of a requested application may be a web-based application, a television-based application, a mobile application etc.

An example of the web-based application may include, but is not limited to, a banking service, a movie rental service, a news update service, a social networking application etc. In various embodiments of the present invention, when the second device 104 sends a request for the same application to the data network 100 as requested by the first device, the data network 100 refrains from sending exact interface or data to the device 104, as it won't be rendered. Suitable changes are made to the navigational aspects, user interface and content of the application in order to render it on to the second device 104. Similarly, in various embodiments of the present invention, when a request is made by different devices for a television-based application, suitable changes may be required to be made for rendering the application on different devices. A method and system for applying changes or transformations to applications for providing them to different devices is explained in conjunction with the description of subsequent figures.

Figure 2:
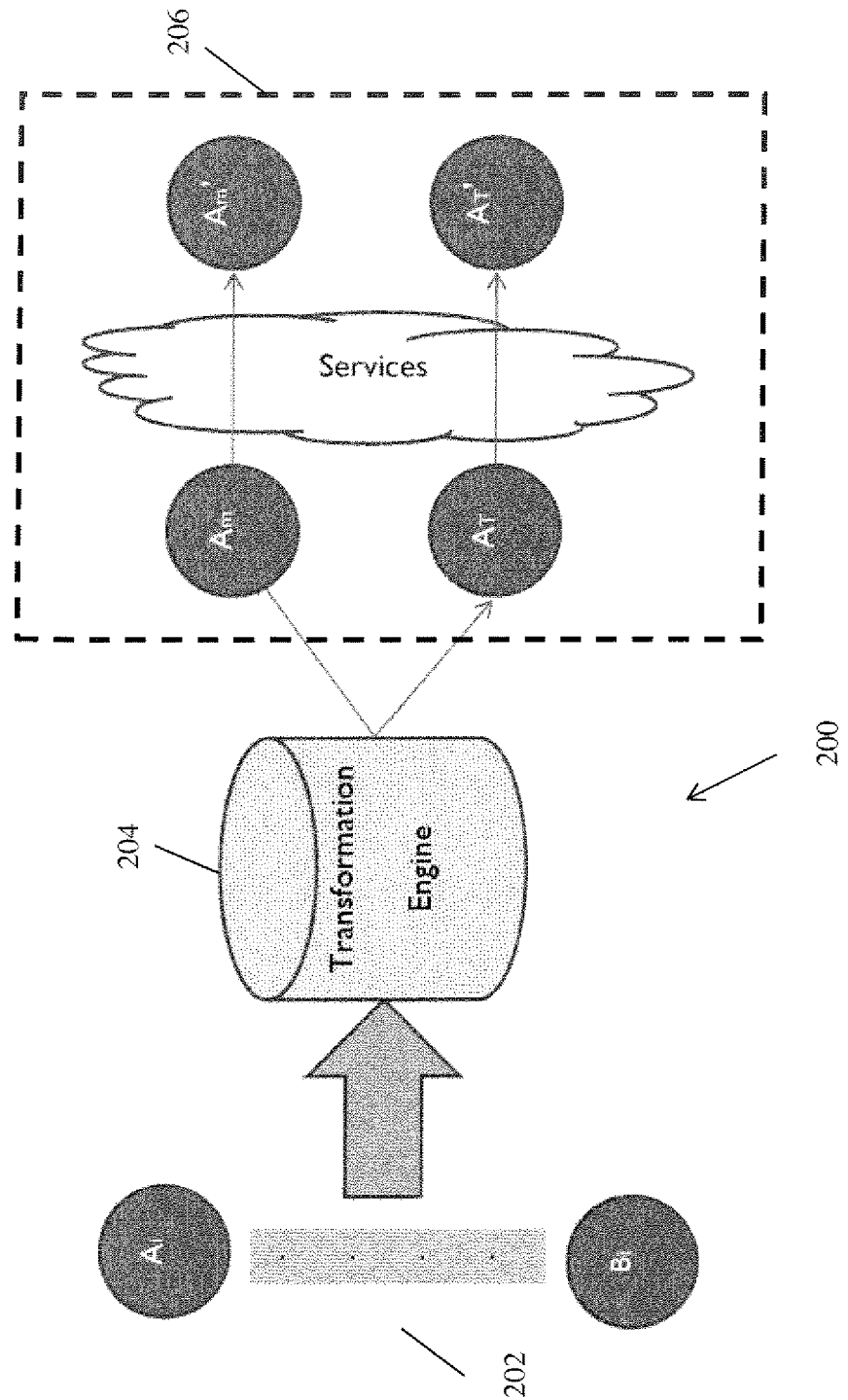
FIG. 2 illustrates basic architecture of a system for providing applications to various devices, in accordance with an embodiment of the present invention.

FIG. 2 illustrates a basic architecture of a system for providing applications to various devices in an exemplary data network (FIG. 1), in accordance with an embodiment of the present invention. The system 200 comprises a host of applications 202, a transformation engine 204, and a set of transformed applications 206.

The host of applications 202 include applications (Ai to Bi) developed for access from any computing or data processing device. In an embodiment of the present invention, the application is a web-based application. In an embodiment of the present invention, a request for accessing a first application Ai may be sent from a device, such as a mobile phone to the data network (FIG. 1). The transformation engine 204 transforms the first application to fit the requirements of the mobile phone. The transformed application is denoted as Am. In another embodiment of the present invention, if a request for accessing a second application Bi is sent from a device, say a television, to the data network (FIG. 1), the transformation engine 204 transforms the second application into a transformed application denoted as At. In various embodiments of the present invention, the transformation performed by the transformation engine 204 may not be 100% accurate and would require some fine tuning with manual intervention to suit specific requirements of a user of the device that sent the request. In an embodiment of the present invention, the transformed applications Am and At are further transformed with manual intervention into Am' and At'. In various embodiments of the present invention, Ai is an application developed for the Internet. Am and At are the "raw" transformed applications for mobile and television respectively. Am' and At' are the enhanced transformed applications for mobile and television respectively.

Figure 3:
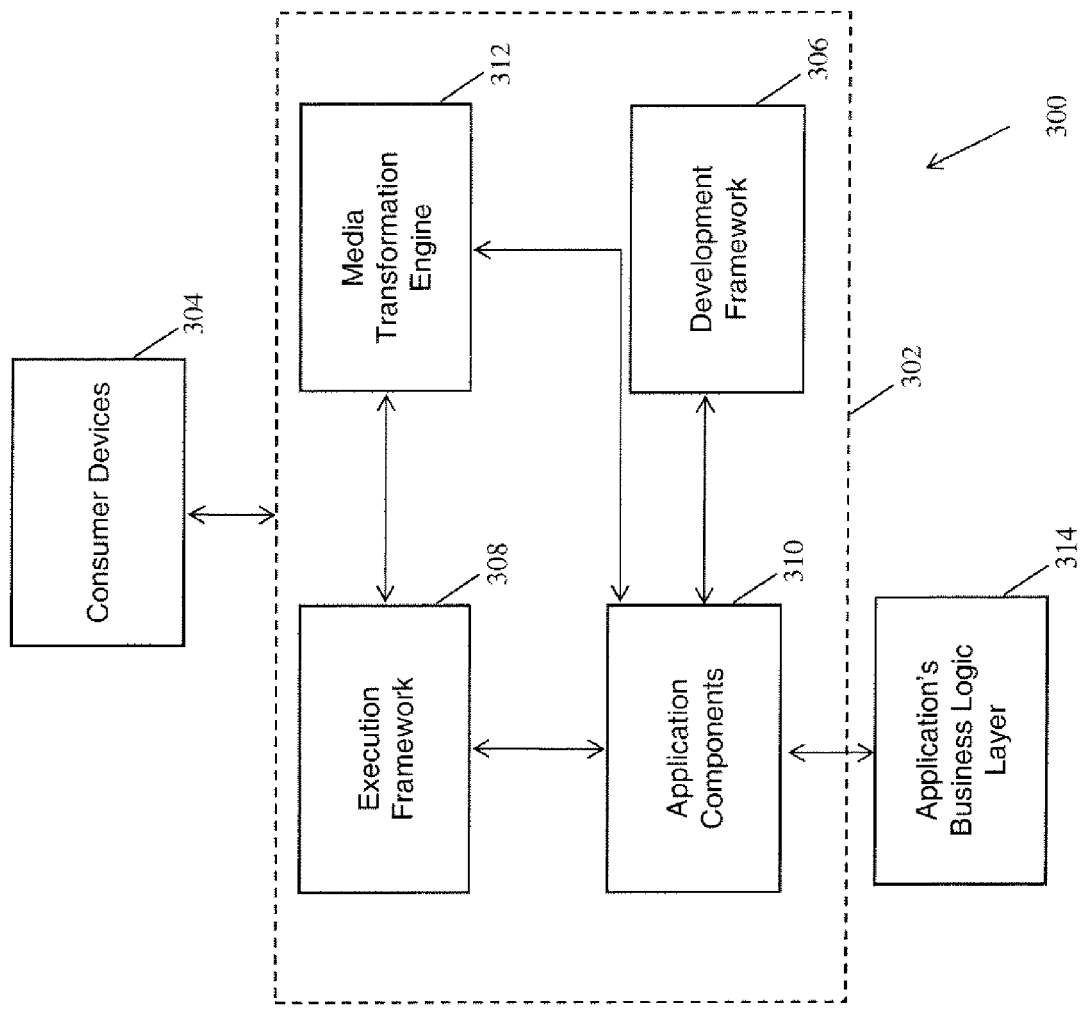
FIG. 3 illustrates an architecture of a system for facilitating rendering of applications on different types of devices.

FIG. 3 illustrates an architecture 302 of the system 300 for facilitating rendering of application on different types of devices. In an embodiment of the present invention, the architecture 302 facilitates rendering of applications onto the devices in the consumer devices module 304. Examples of devices in the consumer devices module 304 include a gamut of devices capable of requesting access to applications and providing for rendering of applications such as mobile phone, television etc. Examples of applications include, but are not limited to, a web-based application, a mobile-based application, a television-based application, gaming application etc.

The architecture 302 comprises a development framework 306, an execution framework 308, an application components module 310, and a media transformation engine 312. In an embodiment of the present invention, the development framework comprises components for developing and storing markup language templates for rendering applications on to various devices. In an embodiment of the present invention, the templates are defined in Extensible Markup Language (XML). In various embodiments of the present invention, the XML templates are defined by a developer using an application programming interface. The XML templates may be stored in a repository in a file system.

The execution framework 308 is responsible for receiving an application request, determining a type of device based on the request and selecting an XML template. Further, the execution framework 308 in conjunction with the application components module 310 generates an XML structure of a page corresponding to the application. The application components module 310 is responsible for invoking page handlers for generating the XML structure of the page.

In an embodiment of the present invention, the page handlers (not shown) contacts an Application's Business Logic Layer 314 to obtain information required to be embedded in the page.

In various embodiments of the present invention, the execution framework 308 generates an output page which is rendered on to the requesting device.

In an embodiment of the present invention, a request for an application from a device may include request for media content. The execution framework 308 passes request for media content to the media transformation engine 312 which provides media content to the requesting device.

Figure 4:
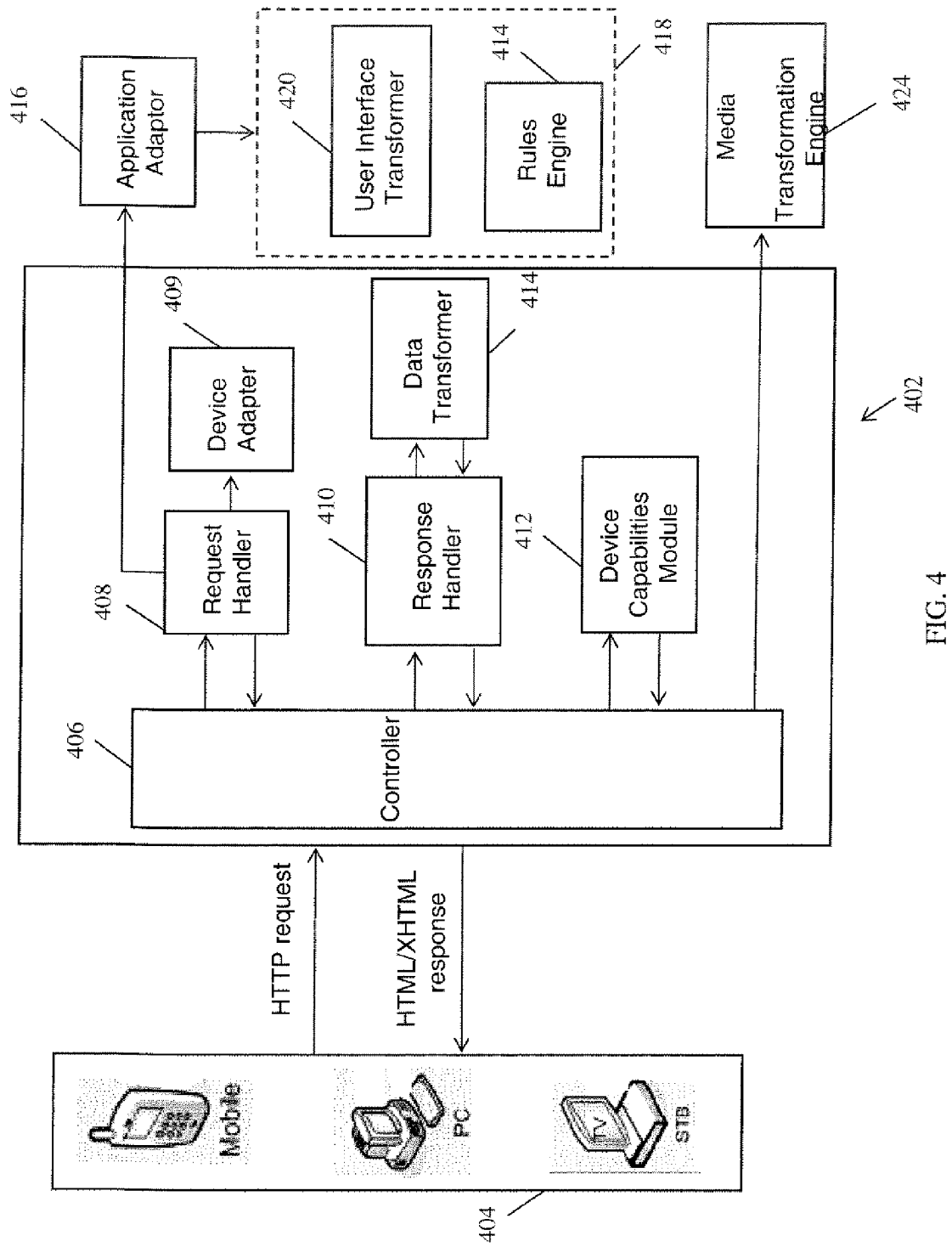
FIG. 4 illustrates a logical architecture of a system for providing applications to devices, in accordance with an embodiment of the present invention.

FIG. 4 illustrates a logical architecture of a system 402 for providing applications to devices, including the architecture of execution framework, in accordance with an embodiment of the present invention. The system 402 comprises the following components for providing the applications to devices in a device hosting module 404: an execution framework comprising a controller 406, a request handler 408, a device adapter 409, a response handler 410, a device capabilities module 412, and a data transformer 414. Further, the system 402 includes an application adaptor 416, a development framework 418 comprising a user interface transformer 420 and a rules engine 422, and a media transformation engine 424. In an embodiment of the present invention, the applications may include various web-based applications, mobile applications, applications for rendering on a television, a gaming application or any application for rendering on an electronic device having a user interface. In an embodiment of the present invention, the device hosting module 404 is connected to the system 402 through a data network (FIG. 1), as described in conjunction with the description of FIG. 1. As shown in FIG. 3, the device hosting module 404 may include devices such as, a mobile phone, a personal computer, a television, and the like. In an embodiment of the present invention, a device, such as a mobile phone may request access to an application in the data network (FIG. 1). In another embodiment of the present invention, device such as television may request for an access to mobile application or web application. In yet another embodiment of the present invention, a personal computer or laptop may request for an access to a mobile application or a television application.

In various embodiments of the present invention, a user accesses a web-based application by entering a URL in a browser of the requesting device. In an embodiment of the present invention, the requesting device may include devices such as, a personal computer, a television, a mobile phone, a personal digital assistant, a blackberry and the like having standards based browser for rendering a Hypertext Markup language (HTML) or Extensible Hypertext Markup Language (XHTML) application on the requesting device. The request is received by a web/application server that is front ending the application environment. In various embodiments of the present invention, the controller 406 in the system 402 receives the request for the web-based application from the web/application server. Thereafter, the controller 406 extracts details of the web-based application request.

Further, the controller 406 transfers the request to the device capabilities module 412. Information about capabilities of various standard devices is stored in a database which is accessed by the device capabilities module 412. In an example, capabilities of a device include capabilities related to aspect ratio, display resolution, available media players etc. and the capabilities of the browser/interpreter on the device such as support for JavaScript, media types, fonts etc. In an embodiment of the present invention, the device capabilities module 412 gets information about capabilities of the requesting device and sends the information back to the controller 406. Then, the controller 406 passes the request information to the request handler 408.

In various embodiments of the present invention, the development framework 418 is configured to generate XML templates of standard applications. The XML templates are generated by applying rules stored in the rules engine 422. In an embodiment of the present invention, an HTML file of a standard application is converted to an Extensible Markup Language (XML) file using rules stored in the rules engine 422. A standard template is a layout generated for a specific category of applications. In an embodiment of the present invention, typical web-based applications are classified into categories and for each category a standard "template" is generated. Examples of categories may include, but are not limited to, application categories such as, banking, video store, social networking, local updates and the like. Further, the user interface transformer 420 comprises XML templates defining user interface layout data for rendering data onto devices such as television, mobile device etc. The XML templates corresponding to standard application categories and device-specific templates are stored in a repository in the file system.

The request handler 408 accesses the application adaptor 416 to identify the applications adapter class to be invoked and then instantiates the class. The application adaptor 416 further invokes page handlers to generate Extensible Markup Language (XML) structure for a corresponding page of the application. In an embodiment of the present invention, the page handlers are stored as configuration files. A page handler facilitates transformation of format of the web-based application to suit the type of the device requesting the web-based application. The page handlers utilize XML templates corresponding to standard application categories and device-specific templates stored in a repository in the file system for generating Extensible Markup Language (XML) structure for a corresponding page of the application. In an embodiment of the present invention, the page handlers contacts Business Logic Layer to get information required to be embedded in the page.

In an embodiment of the present invention, a device in the device hosting module 404, such as a television, may request access to a web-based application, such as a gaming application, that requires an input mechanism, such as, a QWERTY keyboard. The application adaptor 416 therefore performs navigational transformation and facilitates a virtual keyboard to be displayed on the television screen. The virtual keyboard enables the user of the television to enter input on the web-based application by using a television remote. The application adaptor 416 modifies the XML file of the requested application with user interface layout data of the television for adapting user interface of the application to suit requirements of the television. In an embodiment of the present invention, the application adaptor 416 uses information about capabilities of the requesting device (television) for generating an XML file for the requested application.

In an embodiment of the present invention, the application adaptor 416 sends back the XML file to the request handler 408. Thereafter, the request handler 408 sends the XML string received from the application adaptor 416 to the controller 406. The controller passes the raw XML string along with information required to transform the user interface to the response handler 410. In an example, the information required to transform user interface includes style sheets and transformation logic.

Further, the response handler 410 passes information to the Data Transformer 414. Thereafter, the data transformer 414 generates the final output page either in HTML or XHTML format that can be rendered on a user device. In an embodiment of the present invention, the data transformer 414 returns output page to the response handler 410. The response handler 410 thereby returns the output page to the controller 406 and the controller 406 returns the output page to the device requesting the web-based application.

Figure 5:
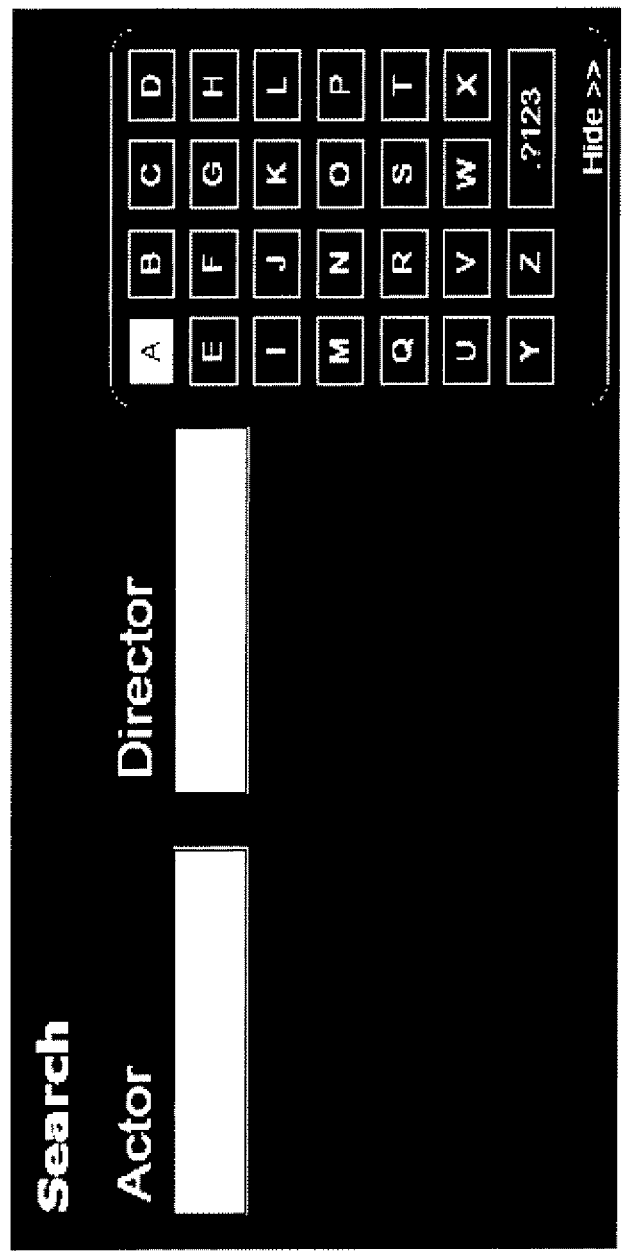
FIG. 5 illustrates screenshot of an application for rendering display on a device such as a television.

FIG. 5 illustrates screenshot of an exemplary web-based application for performing a search for movie titles. As shown in the figure, the movie search display on a television requires rendering of a virtual keyboard for a user to enter data. In an embodiment of the present invention, the user interface elements required to be displayed include provision for entering data corresponding to the categories "Actor" and "Director" using the virtual keyboard. Further, the system 302 (FIG. 3) provides for rendering of list of "movie titles" based on input by the user.

Figure 6A:
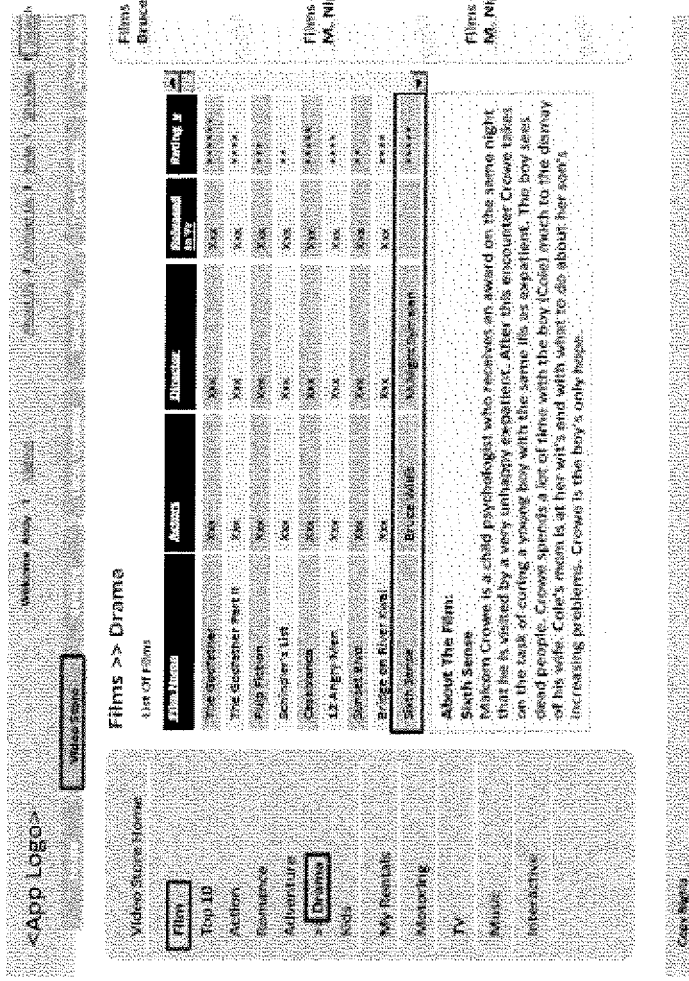
FIGS. 6A and 6B illustrate screenshots of a list of images converted from a list of text for display based on type of device, in accordance with an embodiment of the present invention.
Figure 6B:
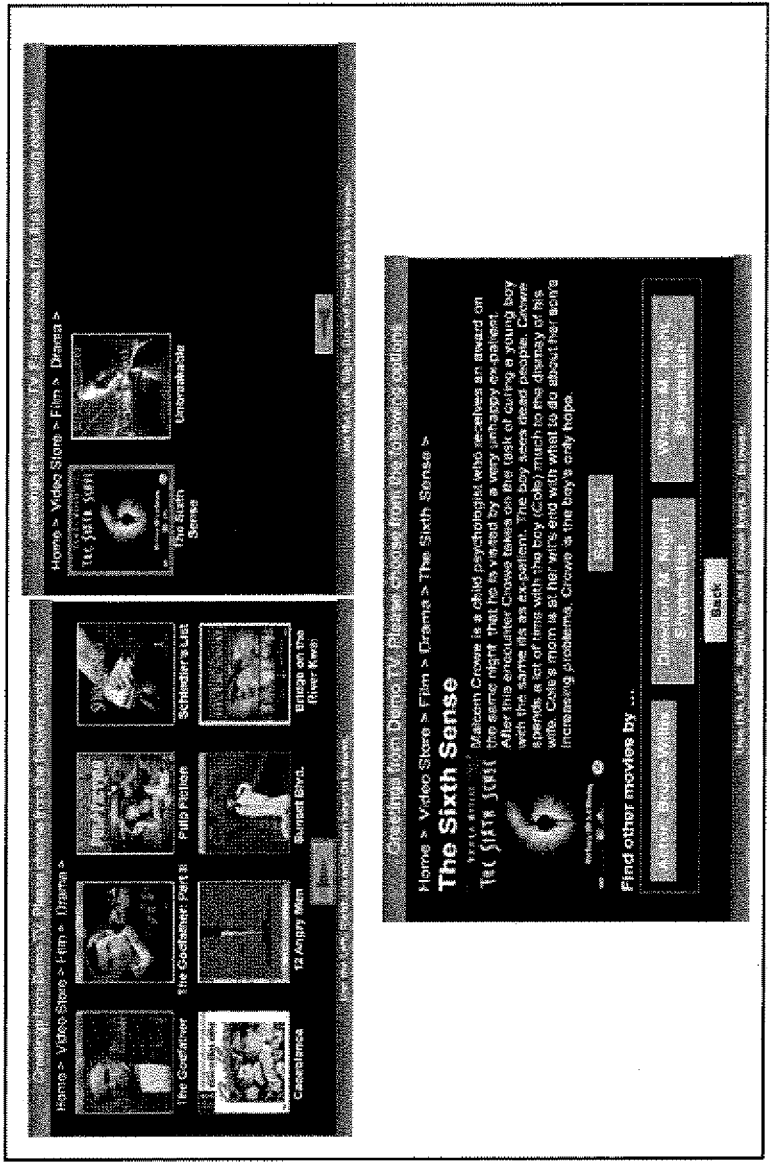

FIGS. 6A and 6B illustrate screenshots of a list of images converted from a list of text for display based on type of device, in accordance with an embodiment of the present invention.

Figure 7:
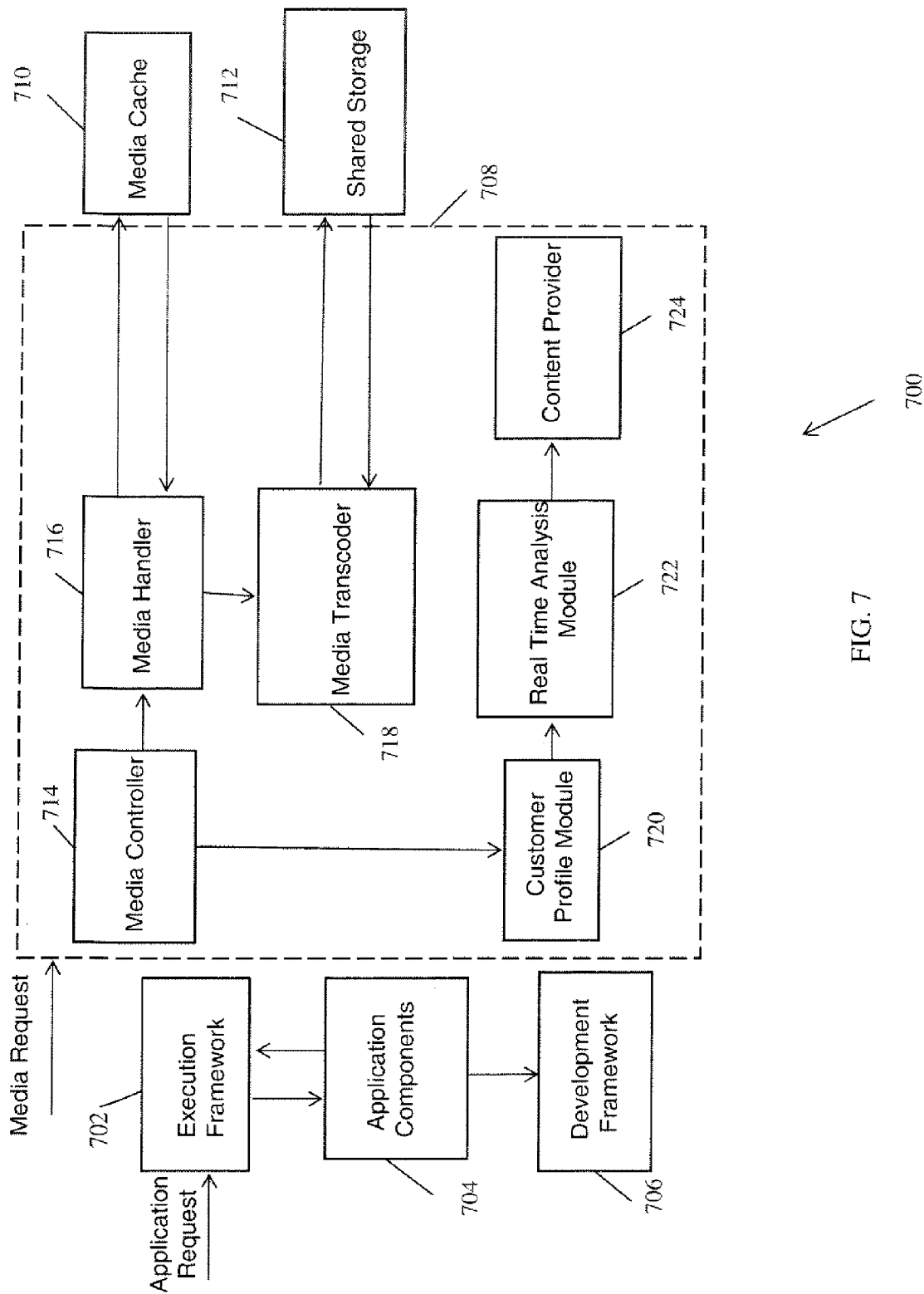
FIG. 7 illustrates a detailed architecture of a system for providing applications to various devices including the architecture of media transformation engine, in accordance with an embodiment of the present invention.

FIG. 7 illustrates a detailed architecture of a system for providing applications to various devices including the architecture of media transformation engine, in accordance with an embodiment of the present invention. The system 700 comprises an execution framework 702, an application components module 704, a development framework 706, a media transformation engine 708, a media cache 710 and a shared storage for transformation 712. The media transformation engine 708 comprises a media controller 714, a media handler 716, a media transcoder 718, a customer profile module 720, a real time analysis module 722, and a content provider 724.

As described in FIG. 3, when a request for a web-based application is received from a user by the system for providing applications, the system transforms the navigational and user interface related aspects of the requested application. Referring now to FIG. 7, the execution framework 702 in conjunction with the application components module 704 transforms the navigational and user interface related aspects of the requested web-based application. In an embodiment of the present invention, the execution framework uses templates developed in the development framework 706 for the transformation. The development framework facilitates the user to write a code for a particular application only once for rendering the application on different devices. The user may be a developer or any other person using the development framework. Thus, an application that is written for rendering on a mobile phone, need not be re-written when a request for the same application is made to render on a television This would facilitate the user to focus on implementing functionality efficiently.

In an embodiment of the present invention, the execution framework 702 includes the following components illustrated in FIG. 3: the controller 306, the request handler 308, the response handler 310, the device capabilities module 312 and the data transformer 318.

The development framework comprises the user interface transformer 320 (FIG. 3) and the rules engine 314 (FIG. 3). Further, if the requested web-based application requires provision of transformed media content to the requesting device, the request to access media content is sent to the media transformation engine 708. Examples of content that may require transformation includes, but is not limited to, images, audio, video etc.

The request for media content is sent to the media controller 714. In an embodiment, the request is accompanied by one or more parameters needed to identify the media. The parameters may include device type, bit rate, format etc.

Upon receiving the request for content, the media controller 714 contacts the device capabilities module 312 (FIG. 3) in the execution framework 702 in order to receive capabilities of device requesting the web-based application. In an example, capabilities of a device include capabilities related to screen size of the device.

The media controller 714 then passes the request to the media handler 716. The media handler 716 checks the media cache 710 to see whether a transformed version of the requested content for the type of device requesting the content is available. In various embodiments of the present invention, frequently requested content is transformed in advance and stored in the media cache 710. This is done so that a requested application is delivered in shortest possible time by accessing transformed content from the media cache 710 instead of generating transformed content dynamically in the media transformation engine 708.

The steps for storing frequently requested content in the media cache 710 comprises the initial step of tracking access information. In an embodiment of the present invention, access information being tracked includes, but is not limited to, types of web-based applications accessed, types of content requested etc. Based on requests received by the media controller 714, the customer profile module 720 receives user preferences and usage information. The user preferences and usage information is then passed on to the real time analysis module 722. The real time analysis module 722 analyses the user preferences and constructs content data that is most likely to be requested in near future based on usage pattern. In various embodiments of the present invention, the content data is pre-fetched from the content provider 724 and transformed into most popular device-specific formats. The transformed content elements are then stored in the media cache 710.

In an embodiment of the present invention, if transformed content for a requested application is available in the media cache 710, a Universal Resource Identifier (URI) corresponding to the media content is returned to the media controller 714. The media controller 714 then returns the URI to the requesting application.

In another embodiment of the present invention, if transformed content for a requested application is not available in the media cache 710, the media handler 716 communicates the media transcoder 718. The media transcoder 718 fetches media content from the shared storage 712. Subsequently, the obtained content is then transcoded by the media transcoder 718 into a format requested by the requesting device. The media transcoder 718 then stores the transcoded media content in the media cache 710.

In an embodiment of the present invention, the media handler 716 retrieves URI corresponding to the transcoded media content from the media cache 710 and returns the URI to the media controller 714. The media controller 714 then sends the media content to the requesting application.

Figure 8:
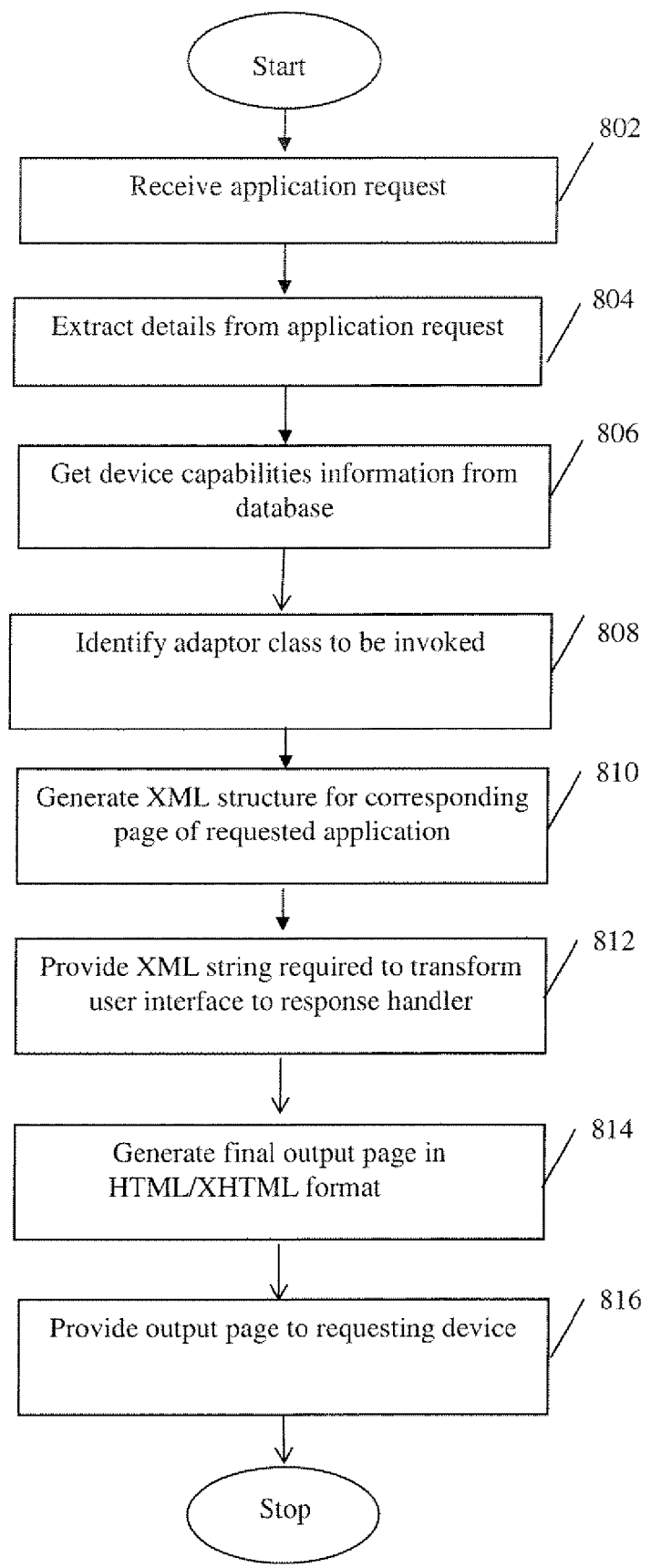
FIG. 8 illustrates a flowchart for providing navigational and user interface related aspects of a requested application.

FIG. 8 illustrates a flowchart for providing navigational and user interface related aspects of a requested application. At step 802, a request for an application is received by the system for providing applications. In an embodiment of the present invention, a user accesses a web-based application by entering a URL into a browser in the requesting device. The request is received by a web/application server that is front ending the application environment of the system. The web/application server passes the request to a controller component. At step 804, necessary details from the application request are extracted by the controller and the device capabilities component is contacted. At step 806, the device capabilities component gets device capabilities information from a database and sends it back to the controller. The controller thereafter calls request handler component and passes the application request information to the request handler component. At step 808, the request handler uses application adaptor component to identify an adaptor class to be invoked and then instantiates the class.

At step 810, an XML structure for corresponding page of requested application is generated. In an embodiment of the present invention, the application adaptor component invokes respective page handlers to generate XML structure for corresponding page. In an embodiment of the present invention, page handlers contact business logic layer to get information required to be embedded in a page.

At step 812, an XML string required to transform user interface is provided to response handler. In an embodiment of the present invention, the application adaptor component generates the XML string and sends it to the request handler component. Thereafter, the request handler returns the string to the controller which passes the raw string along with details required to transform user interface to response handler component. In an embodiment, the details include style sheets, transformation logic etc. In an example, if the request contains a request for a media component, the request handler gets the media's URL from Media Transformation Engine (MTE) component and embeds the URL in the response XML sent to response handler.

At step 814, a final output page is generated in HTML/XHTML format. In an embodiment of the present invention, the response handler passes information required to transform user interface to data transformer component. The data transformer then generates the final output page in HTML/XHTML format that can be rendered on a user device.

At step 816, the final output page is provided to the requesting device. In an embodiment of the present invention, the data transformer returns output page to response handler. The response handler returns the page to the controller that provides the page to the requesting device.

Figure 9:
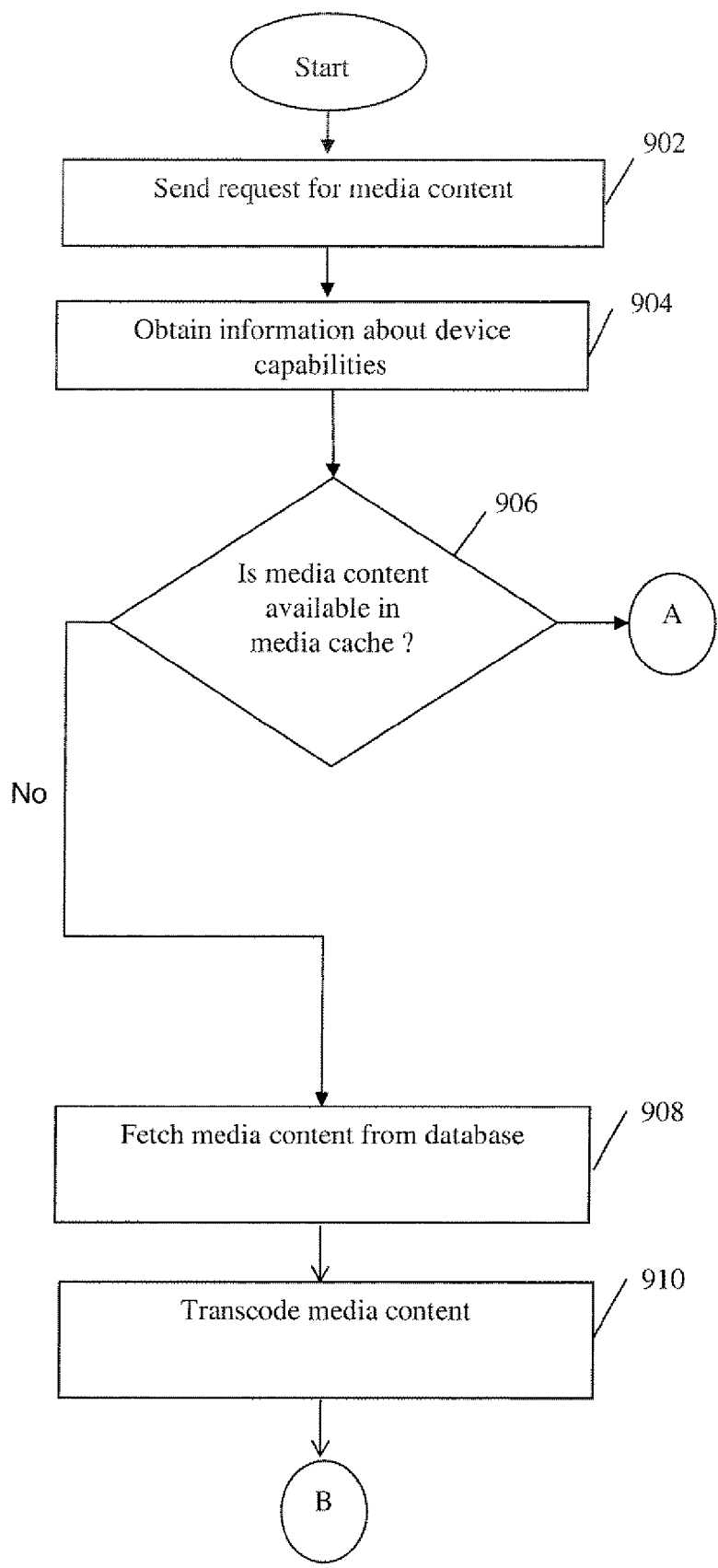
FIGS. 9 and 10 illustrate a flowchart for providing media content in a device compatible format to a requesting application.
Figure 10:
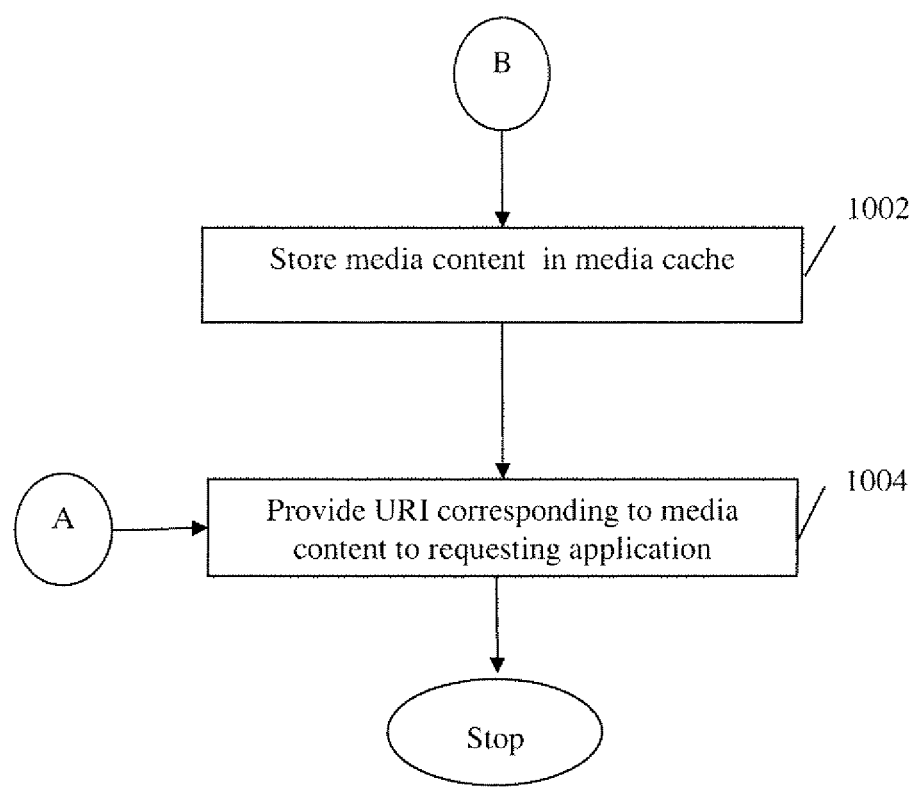

FIGS. 9 and 10 illustrates a flowchart for providing media content in a device compatible format to a requesting application. At step 902, an application sends a request for media content. In an embodiment of the present invention, the request is accompanied by one or more parameters needed to identify the media. At step 904, information about capabilities of requesting device is obtained. In an embodiment of the present invention, a media controller contacts a device capabilities module to get capabilities of device requesting the web-based application. In an example, capabilities of a device include capabilities related to screen size of the device, processing speed of the device etc.

At step 906, it is checked whether the requested media content is available in the media cache. In an embodiment of the present invention, the media controller passes the request for media content to the media handler. The media handler checks the media cache to see whether a transformed version of the requested content for the type of device requesting the content is available. At step 1004, if the requested media content is available in the media cache, a Universal Resource Identifier (URI) corresponding to the media is returned to media controller. The media controller then returns the URI to the requesting application.

At step 908, if the requested media content is not available in the media cache, the media content is fetched from a shared storage database by the media transcoder. Thereafter, at step 910, the fetched media content is transcoded according to the format of the requesting device by the media transcoder.

At step 1002, the fetched media content is stored in the media cache by the media transcoder. Subsequently, the media transcoder informs media handler that required media content is available in the media cache database. At step 1004, the URI corresponding to the media content is provided to the media controller and the media controller provides the URI to the requesting device.

The method and system of the present invention can be used to provide service providers with fast and efficient ways to build applications for various devices. The system helps service providers to reduce time-to-market by helping service providers quickly develop and deploy applications on different channels. The system helps service providers to reduce time-to-market by helping service providers quickly develop and deploy applications on different channels. Also, costs involved in development and deployment are reduced to a great extent. Further, user characterization can be done efficiently due to a single platform for recording and analysis. Hence, service providers can provide better services to the users.

The system provides users with a transformation in the user interface and navigation of the applications to suit the device used to access the application. This eases out the efforts that users had to put in earlier systems to scroll the page of the application and enter keywords/strings in the application. Further, the most popular content on various applications is converted to formats suitable for various devices and is stored in a media cache. This reduces the workload and time delay in providing users with content on certain popular applications.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A system for providing access to an application on a television, the system comprising:
   a development framework configured to facilitate generation of software code for rendering the application on the television;
   an execution framework comprising, a controller, a request handler configured to identify the applications Adapter Class to be invoked and further configured to instantiate the Class; a device adapter configured to adapt the application to the television; a data transformer configured to generate an output corresponding to the application in at least one of an HTML and an XHTML format, wherein the output is generated based on the XML structure generated by the application adaptor; and a response handler configured to provide the output to the television requesting the application through the controller, said framework configured to:
      receive a request from the television for an access to the application associated with a mobile phone, wherein the request is sent from the television using a virtual QWERTY keyboard displayed on the television, further wherein the application consists one of: a banking application, a movie rental application, a news update application, and a social networking application;
      extract information related to capabilities of the television from a database, wherein the capabilities consists of aspect ratio, display resolution, media player, and a browser associated with the television
      transform navigational and user interface related aspects of the requested application associated with the mobile phone to make the application compliant with capabilities of the television and further configured to provide one or more output corresponding to the requested application to the television;
   an application adaptor configured to generate a Markup Language structure of the requested application; and
   a media transformation engine comprising a media controller, said engine configured to provide media content requested by the application to the television.

2. The system of claim 1, wherein the markup language is an Extensible Markup Language.

3. The system of claim 1, wherein the development framework is configured to facilitate generation of markup language code for rendering the application on the television, wherein the markup language code comprises user interface layout data for the television.

4. The system of claim 1, wherein the development framework is further configured to facilitate generation of markup language code for rendering the application on various kinds of mobile devices, wherein the markup language code comprises user interface layout data for various kinds of mobile devices.

5. The system of claim 1, wherein the development framework is further configured to facilitate generation of markup language code for rendering the application on various kinds of personal computers, wherein the markup language code comprises user interface layout data for various kinds of personal computers.

6. The system of claim 1, wherein the development framework comprises an Application Programming Interface (API) for a developer to generate the software code for rendering the application on the television.

7. The system of claim 1, wherein the application is further at least one of a web-based application, a television based application, and a gaming application.

8. The system of claim 1, wherein the television requests the application associated with the mobile phone through a data network.

9. The system of claim 8, wherein the data network is at least one of the Internet, an Intranet and a network of two or more electronic devices.

10. The system of claim 1, wherein the response handler is further configured to receive XML string along with information required to transform user interface from the controller and further configured to pass the received information to the data transformer.

11. The system of claim 1, wherein the media content requested by the application comprises at least one of images, video and audio.

12. The system of claim 1, wherein the television is at least one of, a set top box, Internet Protocol Television (IPTV), OpenCable Application Platform (OCAP)-based cable television, Enhanced TV Binary Interchange Format (EBIF)-based cable television, and a Digital Television (DTV).

13. The system of claim 1, wherein the development framework comprises:
a user interface transformer configured to store markup language templates defining user interface layout data for rendering data on the television; and
a rules engine configured to facilitate creation of markup language templates for the television.

14. The system of claim 13, wherein the markup language templates are created by a developer using the Application Programming Interface (API).

15. The system of claim 13, wherein the markup language is an Extensible Markup Language (XML).

16. A system for providing access to an application on a television, the system comprising:
a development framework configured to facilitate generation of software code for rendering the application on the television;
an execution framework comprising, a controller, said framework configured to:
receive a request from the television for an access to the application associated with a mobile phone, wherein the request is sent from the television using a virtual QWERTY keyboard displayed on the television, further wherein the application consists one of: a banking application, a movie rental application, a news update application, and a social networking application;
extract information related to capabilities of the television from a database, wherein the capabilities consists of aspect ratio, display resolution, media player, and a browser associated with the television
transform navigational and user interface related aspects of the requested application associated with the mobile phone to make the application compliant with capabilities of the television and further configured to provide one or more output corresponding to the requested application to the television;
an application adaptor configured to generate a Markup Language structure of the requested application;
a media transformation engine comprising a media controller, said engine configured to provide media content requested by the application to the television,
a media controller configured to deliver request for media content to a media handler;
a media handler configured to check whether a transformed version of requested content is available in a media cache; and
a media transcoder configured to transform content from a shared storage in order to conform the content in accordance with requirements of the television.

17. The system of claim 16, wherein the media transformation engine further comprises:
a customer profile module configured to track access information and receive user preferences and usage information based on one or more requests received;
a real time analysis module configured to receive the user preferences and usage information from the user profile module and further configured to construct content data most likely to be requested based on usage information; and
a content provider configured to store content data in accordance with one or more television-specific formats.

18. The system of claim 16 further comprising:
a media cache configured to store frequently requested content transformed in accordance with requirements of the television; and
a shared storage configured to store standard untransformed content, wherein the media transcoder utilizes data from shared storage in order to conform the content in accordance with requirements of the requesting television.

19. A method for providing access to an application on a television, the method comprising:
receiving a request from a television for an access to an application associated with a mobile phone, wherein the request is sent from the television using a virtual QWERTY keyboard displayed on the television, further wherein the application consists one of: a banking application, a movie rental application, a news update application, and a social networking application;
sending a request for media content to a media controller;
obtaining information about capabilities of the television by extracting, using a controller, information related to capabilities of the television from a database, wherein the capabilities consists of aspect ratio, display resolution, media player, and a browser associated with the television;
checking whether media content in desired format is available in media cache based on capabilities of the television;

extracting Uniform Resource Identifier (URI) corresponding to the media content, if the media content is available in the media cache;

generating Extensible Markup Language structure of the requested application;

transforming navigational and user interface of the application associated with the mobile phone to make the application compliant with the capabilities of the television;

generating an output corresponding to the requested application, wherein the output is in at least one of an Hypertext Markup Language format and an Extensible Hypertext Markup Language format;

providing the output corresponding to the requested application for rendering on the television; and providing the URI to the television.

20. The method of claim 19, wherein generating the Extensible Markup Language structure comprises:

identifying the applications' Adaptor Class to be invoked and instantiating the Class; and invoking page handlers to generate the Extensible Markup Language structure of the requested application.

21. The method of claim 20, wherein invoking page handlers comprises contacting business logic layer to get information required to be embedded in the generated Extensible Markup Language structure.

22. The method of claim 19, wherein generating an output corresponding to the application comprises using raw XML string along with details required to transform user interface to generate the output in at least one of an HTML and XHTML format, wherein the details consists of style sheets and transformation logic.

23. The method of claim 19 further comprising:

fetching media content from shared storage database, if it is determined that media content in desired format is not available in the media cache;

transcoding media content in a format supported by the television and storing the media content in the media cache; and providing URI corresponding to the transcoded media content to the television.

* * * * *